Patented Nov. 19, 1940

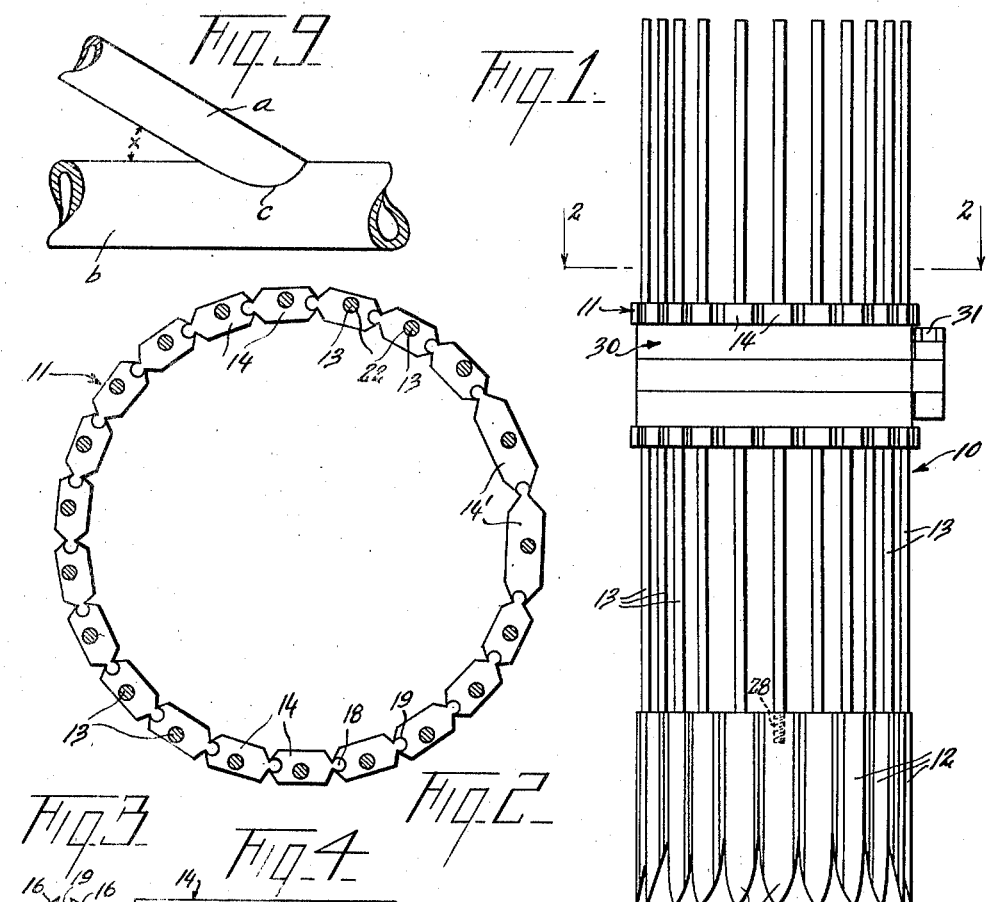

2,222,127

UNITED STATES PATENT OFFICE 2,222,127

INTERSECTION MARKER

Hubert N. Turner, Nashville, Tenn.

Application March 17, 1939, Serial No. 262,582

7 Claims. (Cl. 33—175)

This invention relates to a measuring and fitting device and more particularly to a device to be known as an intersection marker.

At times it is necessary to join two pipes of the same or different diameters disposed one in abutting relation to and at an angle to the other without the aid of special connecting fittings as where it is desired to directly connect a pipe between the ends of another pipe in axially intersecting relation. In such a situation it is very difficult to accurately shape the end of the abutting pipe to fit over the other pipe such requiring accurate measurements and the laying out of an accurate turn plate all of which is tedious and requires the expenditure of a great amount of time and labor.

Accordingly, it is the principal object of this invention to provide a simple and easily operated indicator device or intersection marker which is adjustable as to simulate a pipe of any desired diameter within certain predetermined limits, such device being made up of a plurality of longitudinally movable and circumferentially interconnected members, the device being further adjustable so that when applied to a pipe in any desired angle relative thereto the ends of the longitudinal members contacting said pipe will assume or indicate the desired shape of the end of the pipe to be joined to said pipe. By marking off the shape assumed by said ends of the intersection marker on a sheet of paper circumferentially applied to the intersecting marker, a template is quickly formed which when cut and transferred to the end of the pipe to be shaped will enable the accurate cutting and forming of said end to properly fit the pipe to which it is to be attached.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Figure 1 shows in side elevation the intersection marker.

Figure 2 shows a plan view of the retainer ring taken on line 2—2, Figure 1.

Figures 3, 4, and 5 show respectively in end, plan and side views one of the links making up the retainer ring.

Figures 6, 7 and 8 show respectively in end, plan and side views one of the indicators.

Figure 9 illustrates two pipes joined together in angular relation.

Referring to the drawing in detail, there is shown in Figure 9, a smaller pipe $a$ inclined at an angle to the larger pipe $b$ and secured thereto as by a welded joint along the abutting edge $c$ of the pipe $a$. It is obvious that to effect such a connection it is necessary to properly shape the edge $c$ of the pipe $a$ so as to conform with the outer cylindrical surface of the pipe $b$ which shape of edge is wholly dependent upon the angle of the pipe $a$ with relation to the pipe $b$.

The intersection marker 10 as embodying the principles of the invention is operable to obtain the desired shape of the abutting edge such as $c$ of the inclined pipe $a$ to be fitted to the surface of an associated pipe such as $b$, in the manner to be hereinafter described.

The intersection marker 10 comprises a retainer ring 11 and a plurality of independent longitudinally movable indicators 12 each having a rod 13 extending through said ring. The retainer ring 11 is made up of a plurality of link elements 14 connected together in pivotal interlocking relation. Thus, each link 14 comprises a flat body portion 15 rectangular in form, the side longitudinal edges of which are double beveled as at 16—16 and 17—17. Formed integral with the beveled side 17—17 is a cylindrical lug 18 which is disposed in the longitudinal center plane of the link and which extends the full length thereof. On the other beveled side 16—16 there is provided in the same longitudinal center plane a cylindrical recess 19. The outer flat side 20 of the body portion 15 of the link is cut away intermediate the ends thereof to define a seat 21 for a clamping band to be hereinafter described. Extending longitudinally through the body portion of the link 14 is a bore 22 the axis of which is off-set with relation to the center longitudinal plane of the link, said bore being so related to the seat 21 as to cut through the same to define the slot 23.

The links 14 are assembled in the form of an endless chain by the interengagement of the cylindrical lugs 18 within the cylindrical recesses 19 in the manner clearly shown in Figure 2. Any number of links 14 may be utilized to provide any desired diameter of retainer ring as will be hereinafter described. In order to allow for desired variations in diameter in the adjustment of the intersection marker, certain of the links in the retainer ring such as 14' may be made of slightly greater width than the links 14. Also, though not shown, links are to be provided that will be of less width than the links 14. Thus by a proper combination of links of varying width the intersection marker may be adjusted to any desired pipe diameter within certain predetermined limits for which the size of the device is applicable.

The indicators 12 of the intersection marker are each of the same general construction as the links 14, as to the body portion 15', beveled sides 16'—16' and 17'—17', cylindrical lug 18' and cylindrical recess 19', and are adapted to be interconnected to form an endless ring of the same character and size as the retainer ring 11. Each of the indicators 12 are of the same length and at their outermost end portions are sharply beveled on their inner sides as at 25, the terminal edge of said indicator being rounded as at 26. The other end portion of the retainer 12 is provided with a longitudinal threaded bore 27 extending part way into the body of the retainer and in the same position therein as the bore 22 in the link 14. As with the links 14, the indicators 12 are made in the same varied width sizes. Thus the retainers 12 should correspond with links 14 both in number and sizes in their respective interconnected relation, those of like size being in longitudinal alignment.

Removably secured to each indicator is a rod 13, one end of which is threaded as at 28 for engagement with the threaded opening 27 in said indicator, the rods 13 being inserted through the bores 22 in the corresponding links 14 and 14' of the retainer ring 11, see Figure 2, thus lining up links and indicators of like size. The rods 13 are preferably of the same length. As shown in Figure 5, a portion of the surface of each rod indicated by 13' projects through the slot 23 above the plane of the seat 21. Fitted within the recess defined by the seat 21 is an annular clamping band 30 of the type as disclosed in U. S. Patent No. 1,849,532, which is adjusted by means of the screw 31. When in clamped position the band 30 grips the exposed portions 13' of the rods 13 to lock the same in their longitudinally adjusted position relative to the retainer ring 11. Upon release of the clamping band 30, the rods 13 are freely movable in the retainer ring 11.

The operation of the intersection marker is as follows:

For a known size or diameter of pipe $a$, the retainer ring 11 and indicators 12 are adjusted to correspond with said diameter of pipe by varying the number and size of the links and indicators in the manner as hereinabove described. With the clamping band 30 released and by means of a bevel protractor the intersection marker is placed on the pipe $b$ at the desired angle $x$, see Figure 1. By a proper downward movement of the intersection marker each of the indicators 12 will be moved relative to each other so as to be in engagement with the surface of the pipe $b$, the beveled ends 25 and rounded end edges 26 of the indicators contacting said pipe surface. With each of the indicators 12 in proper adjusted position, the clamping band 30 is tightened to thus securely lock the rods 13 carrying the indicators 12 to the retainer ring 11. The intersection marker is then removed from the pipe $b$ and the shape assumed by the edges 26 of the indicators 12 will correspond to the desired curved edge $c$ defined by the intersection of the pipe $a$ with the pipe $b$. A template of the curved edge $c$ is then formed by placing a sheet of paper around the indicators 12 and marking off thereon the outline of said curved edge $c$ as defined by the relative positions of the edges 26 of the indicators 12. The sheet of paper is then cut along said marked off line to give the desired curved edge $c$. By then placing said paper template around the pipe $a$ the edge $c$ may be marked off thereon and the pipe properly cut along said line to thereby accurately define the desired curved edge thereon.

Having thus described my invention, I claim as new and desire to secure by Letters Patent:

1. An intersection marker of the character described comprising a plurality of parallel indicators, metallic means supporting said indicators, said indicators being each longitudinally movable thereon relative to each other whereby upon application to a non-planar surface said indicators will assume varied positions corresponding to the contour of said surface, and means carried by said first mentioned means and common to all of said indicators adapted to lock said indicators in their adjusted position.

2. An intersection marker of the character described comprising a plurality of parallel circumferentially arranged indicators, metallic means including circumferentially interconnected supporting elements each slidably mounting an indicator, said indicators being each longitudinally movable relative to each other whereby upon application to a non-planar surface said indicators will assume varied positions corresponding to the contour of said surface, and a single releasable means carried by said first mentioned means and common to all of said indicators adapted to lock said indicators in their adjusted position.

3. An intersection marker of the character described comprising a metallic retainer ring, a plurality of parallel circumferentially arranged indicators disposed in spaced co-axial relation to said retainer ring, individual longitudinal movable rod means connecting each of said indicators to said retainer ring, a single releasable clamping means on said retainer ring common to all of said movable rod means adapted to clamp the same thereto, said indicators upon application to a non-planar surface assuming varied positions corresponding to the contour of said surface, said releasable clamping means being operative to permit the relative movement of said indicators and associated rod means to simultaneously clamp the same in their adjusted position.

4. In the intersection marker as set forth in claim 3, wherein said retainer ring comprises a plurality of articulated link members, recess means formed on said link members adapted to seat said releasable clamping means, said individual longitudinal movable rod means each extending through a link member and its associated recess means and adapted to be engaged by said releasable clamping means.

5. In the intersection marker as set forth in claim 3, wherein said retainer ring comprises a plurality of articulated link members, said indicators being formed similar to said link members and being of a like number and being similarly articulated, each of said indicators being formed to provide a beveled rounded surface engaging edge, the articulation between adjacent link members of said retainer ring and between adjacent indicators being constituted by a cylindrical lug provided on one longitudinal edge thereof pivotally retained within a cylindrical groove provided on an adjacent longitudinal edge of an adjacent one thereof and axially movable therein so as to permit relative longitudinal movement therebetween.

6. An intersection marker comprising a retainer ring formed of a plurality of articulated links, a like plurality of articulated indicators the articulation between adjacent link members of said retainer ring and between adjacent indicators being constituted by a cylindrical lug provided on one longitudinal edge thereof pivotally retained within a cylindrical groove provided on an adjacent longitudinal edge of an adjacent one thereof and axially movable therein so as to permit relative longitudinal movement therebetween, a rod attached at one end to each indicator and extending through a longitudinal bore formed in a corresponding link whereby said indicators are co-axially disposed with relation to said retainer ring, a single releasable clamping means on said retainer ring adapted to simultaneously engage each of said rods to clamp the same in adjusted position, said clamping means when released allowing relative longitudinal movement of said indicators so that when applied to a non-planar surface said indicators will assume the contour of said surface, and will be locked in such adjusted position by the action of said clamping means on said rods.

7. In the intersection marker as set forth in claim 6, wherein each link of the retainer ring comprises a depressed seat formed on the outer sides of said links adapted to receive said releasable clamping means, a longitudinal bore in each link receiving the rod of an associated indicator, the depth of said seat being such as to extend below a wall of said bore as to define a slot whereby said rod will have an exposed portion projecting through said slot above said seat to be engaged by said clamping means.

HUBERT N. TURNER.